(12) United States Patent
Furuskär et al.

(10) Patent No.: US 7,835,384 B2
(45) Date of Patent: Nov. 16, 2010

(54) POWER CONTROL IN A COMMUNICATION NETWORK AND METHOD

(75) Inventors: Anders Furuskär, Stockholm (SE);
Arne Simonsson, Gammelstad (SE);
Jonas Pettersson, Luleå (SE); Stefan Rommer, Västra Frölunda (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 843 days.

(21) Appl. No.: 11/571,561

(22) PCT Filed: Jul. 1, 2004

(86) PCT No.: PCT/SE2004/001081
§ 371 (c)(1),
(2), (4) Date: Mar. 5, 2007

(87) PCT Pub. No.: WO2006/004465
PCT Pub. Date: Jan. 12, 2006

(65) Prior Publication Data
US 2007/0223403 A1  Sep. 27, 2007

(51) Int. Cl.
*H04B 7/005* (2006.01)
(52) U.S. Cl. ............ 370/445; 370/332; 370/337; 370/447; 370/315; 370/338; 455/448; 455/423; 455/426.1; 455/522
(58) Field of Classification Search ......... 370/332, 370/315, 338, 330, 337, 445; 455/423, 426.1, 455/522, 448
See application file for complete search history.

(56) References Cited

U.S. PATENT DOCUMENTS

| | | | |
|---|---|---|---|
| 5,553,316 A | 9/1996 | Diepstraten | |
| 6,230,023 B1 * | 5/2001 | Slanina | 455/522 |
| 6,636,738 B1 * | 10/2003 | Hayashi | 455/450 |
| 7,035,240 B1 * | 4/2006 | Balakrishnan et al. | 370/338 |
| 7,228,149 B2 * | 6/2007 | Backes et al. | 455/522 |
| 7,313,113 B1 * | 12/2007 | Hills et al. | 370/332 |
| 7,385,945 B1 * | 6/2008 | Olson et al. | 370/328 |
| 7,515,557 B1 * | 4/2009 | Bims | 370/315 |
| 7,519,029 B2 * | 4/2009 | Takeda et al. | 370/335 |
| 2002/0176388 A1 * | 11/2002 | Rankin et al. | 370/338 |

(Continued)

FOREIGN PATENT DOCUMENTS

EP  1324509 A2  7/2003

(Continued)

OTHER PUBLICATIONS

Poon et al; "SmartNode: achieving 802.11 MAC interoperability in power-efficient ad hoc networks with dynamic range adjustments" In $23_{rd}$ International Conference on Distributed Computing Systems, 2003, Proceedings May 19-23, 2003, pp. 650-657, ISSN 1063-6927 see pp. 1-2.

(Continued)

*Primary Examiner*—Lewis G West
*Assistant Examiner*—Qun Shen

(57) ABSTRACT

In a wireless network using a carrier sense multiple access (CSMA) scheme is provided a method, system, devices and instruction sets for detecting transmission levels and adjusting the transmission levels for both a connection point and mobile stations within the network in order to reduce power consumption in network devices and minimize interference problems while keeping hidden node problems on a controlled level.

33 Claims, 7 Drawing Sheets

U.S. PATENT DOCUMENTS

| | | | |
|---|---|---|---|
| 2003/0036404 A1* | 2/2003 | Adachi et al. | 455/522 |
| 2003/0100328 A1 | 5/2003 | Klein | |
| 2004/0029590 A1 | 2/2004 | Wentink | |
| 2004/0030713 A1* | 2/2004 | Takano et al. | 707/102 |
| 2004/0106425 A1* | 6/2004 | Koo et al. | 455/522 |
| 2004/0132415 A1* | 7/2004 | Furukawa | 455/78 |
| 2005/0009565 A1* | 1/2005 | Kwak | 455/561 |
| 2005/0243777 A1* | 11/2005 | Fong | 370/338 |
| 2007/0165537 A1* | 7/2007 | Magnusson et al. | 370/254 |

FOREIGN PATENT DOCUMENTS

| | | |
|---|---|---|
| WO | WO 9907105 A2 | 2/1999 |
| WO | WO 0057575 A1 | 3/2000 |
| WO | WO 0291623 A1 | 5/2002 |
| WO | WO 02080397 A2 | 10/2002 |
| WO | WO 03003657 A1 | 1/2003 |

OTHER PUBLICATIONS

Monks et al, "A power controlled multiple access protocol for wireless packet networks" In: IEEE Infocom 2001 Twentieth Annual Joint Conference of the IEEE Computer and Communications Societies Proceedings Apr. 22-25, 2001, vol. 1 pp. 219-228 see p. 221.

Mangold S; Berlemann L: "IEEE 802.11k: Improving Confidence in Radio Resource Measurements", pp. 1009-1013, IEEE International Symposium on Personal, Indoor and Mobile Radio Communications, Berlin, Germany Sep. 11-14, 2005.

* cited by examiner

POWER CONTROL IN A COMMUNICATION NETWORK AND METHOD

FIELD OF THE INVENTION

The present invention relates to radio power control in a wireless network and more specifically to power control of wireless transmissions in a wireless system utilizing Carrier Sense Multiple Access (CSMA).

BACKGROUND OF THE INVENTION

Wireless network solutions are currently being installed at an increasing rate to follow the demand from the market for faster data communication connections and wider wireless coverage of data and voice communication. This demand comes from the fact that the number of services available in public networks, such as the Internet, increases and the contents of many services has a high bandwidth demand. For instance, services such as music and video streaming acquire a high portion of available bandwidth, Voice over IP (VoIP) applications also sets up a demand for higher bandwidth than pure text messages or html data traffic. Voice and VoIP applications also need a certain level of Quality of Service (QoS) in order to reduce latency problems which will degrade the experienced quality of communication. The human is very sensitive to this kind of latency problem.

When setting up the infrastructure for such wireless communication networks, care and consideration must be taken in order to obtain efficient coverage. Many problems may arise in building infrastructure installations since radio communication may be affected by many different disturbances, such as obstacles, other radio sources, moving communication devices, and so on. This is true for fixed installation and even more important for semi fixed or ad hoc network infrastructure installations where it is extremely difficult to predict how infrastructure nodes will interact with each other and with client stations.

In a wireless network with several client stations, sharing the media through time-division, it is important to reduce the number of collisions occurring when multiple stations try to communicate with an infrastructure node, such as a so called Access Point (AP) or base station. One scheme for reducing this risk has been developed for fixed wired data networks and is called CSMA (carrier sense multiple access) with a collision detection (CD) system; however, it is very difficult not to say impossible to implement the CD scheme efficiently in a wireless network without using two radio interfaces operating simultaneously. Therefore, in a wireless network another system is often used: a Collision Avoidance (CA) CSMA system. A client station in such a network must before transmitting traffic, sense the medium to determine if another client station is transmitting. If so, the sensing client station must wait for a minimum specified duration plus a random number of time before initiating a transmission again. However, again the client station must sense the medium for ongoing traffic before transmitting signals.

One problem not solved by the CSMA/CA system in wireless networks is the so called hidden node problem, wherein two stations try to communicate with an infrastructure node, such as a so called access point (AP) or base station, or with another client station in for instance an ad-hoc based network at the same time and they due to network topology considerations can not detect communication from each other. This may occur for instance when two client stations are located on opposite sides of an infrastructure node in such a way that radio signals can not reach from one client station to another, or two client stations both try to communicate with another client station located in such a way that the first two client stations do not detect each others transmissions.

A scheme solving the hidden node problem is the so called RTS/CTS scheme (Request to Send/Clear to Send), wherein nodes communicating with each other must exchange control packets in order to establish a connection before transmitting actual data packets. However, this solution introduces a large overhead in control traffic slowing down communication links and increases the radio transmission overhead.

A crucial parameter in wireless networks for the above mentioned situations is the transmission power level. The power level affects the range of signals, power consumption in devices, interference between nodes, and so on and is thus important to control in a wireless network system. However, a crude power control aiming only at reducing the power levels used, may lead to an increase of hidden node problems.

Several different attempts to control transmission power for both clients and infrastructure nodes have been developed previously for certain applications. In some wireless protocol solutions regulatory demands has been raised in order to be able to set the maximum allowed transmit power in a network cell. This is true for the IEEE 802.11h protocol standard which is an amendment of the IEEE 802.11a protocol standard in Europe. However, in this case only the maximum allowed transmission level is adjustable in order to allow for regulatory demands, this problem do not address the problem of reducing the power consumption for devices or the hidden node problem.

Several authors have addressed the power consumption problem and may be found described in different documents. For instance in WO03003657 Soomro et al disclose a method and apparatus for adjusting the transmission power level by determining a signal to noise margin for the communication link of interest. This scheme is however limited to addressing such problems as of limiting the transmitter power in general, for battery consumption purposes, avoiding radio interference. It does not try to remedy the problem of the hidden node situation discussed above.

US 2003/0100328 discloses adjustment of the power level for both mobile stations (STA) and an access point (AP) in order to minimize radio coverage of an AP in order to reduce interference problems between access points in an area of high AP density. However, this invention only deals with signalling of transmit power control levels to mobile stations and not how to determine the power levels.

In WO9907105 again a system for using optimum transmission levels in a wireless multihop network is disclosed. This applies for the situation when stations communicate with each other and the system takes different quality disturbing parameters into account, such as path loss, phase distortion, time delay, Doppler shift, and multipath fading, all concerned with radio characteristics. However, the invention does not take hidden node problems into account when determining the optimum path for a data packet.

In WO0057575 a path loss estimate is calculated from received power levels during transmission and continued communication power levels are based on this estimate. A similar function is found in WO02091623 but with a slightly different path loss estimation function.

In U.S. Pat. No. 5,553,316 an invention is disclosed that adjusts the transmit power level in order to use only the needed power level for obtaining a reliable transmission. Again, the hidden node problem is not solved. However, a defer threshold value is introduced that limits a sending station to withholding communication when a carrier signal above the defer threshold value is sensed by the sender.

In US patent application 2004/0029590 the hidden node problem is addressed by transmitting data traffic from an access point at a lower power level reducing the risk for the interference problems since thus a lower number of stations can hear the transmission. However, in order to make stations outside the communication area aware of the network, control traffic (such as RTS/CTS/ACK) is transmitted using a higher power level. This system does not address the problem of determining appropriate power levels to avoid hidden node problems when said control traffic, that cause significant overhead, is not used.

SUMMARY OF THE INVENTION

The object of the preferred embodiment of the present invention is to eliminate the above mentioned drawbacks by, in a preferred embodiment of the present invention, providing a transmission power control function in a wireless carrier sense multiple access (CSMA) network, in order to reduce power consumption, minimize interference problems, and to reduce hidden node problems common in CSMA network topologies. The network components measure and detect transmission quality, e.g. due to received transmission power levels, and adjust power levels to ensure that all nodes, or alternatively a desired fraction of nodes, in a cell can detect transmission within the cell. Both a connection point (e.g. an access point, wireless gateway, base station) and mobile stations within the cell may change their respective power levels in response to messages from different nodes due to the detection of transmission below a predetermined quality level.

In a preferred embodiment, a method for optimizing wireless coverage in a wireless network with a carrier sense multiple access (CSMA) scheme is provided, the method comprising the steps of:
  detecting transmissions with respect to a predetermined quality level;
  adjusting a power level in a connection point to enable essentially all mobile stations within a cell to detect transmissions from the connection point;
  adjusting power levels in the mobile stations to enable mobile stations to detect transmissions from other mobile stations.

In the method, the transmission quality level may be determined on a continuous or regular basis.

The step of detecting transmissions below a predetermined quality level may further comprise the steps of:
  detecting the transmission quality level in mobile stations; and
  sending a message to the connection point with information about the detection.

The message may be sent using a Beacon report message available in the IEEE 802.11k protocol.

In the method, the step of detecting the transmission quality may yet further comprise detecting in a first mobile station a partial message exchange between nodes belonging to the same cell as the first mobile station.

The method may also further comprise the step of using a hidden node report available in a wireless communication protocol for distributing information about the detection of partial transmissions. The detection of transmission quality may include the step of measuring transmission signal strength.

The method may further comprise the step of enabling one or several mobile stations outside an adjusted coverage area determined by the transmission signal strength to associate with the connection point using an alternating transmission power level of the connection point between the adjusted power level and a higher power level, or by responding to an active scanning method with higher power than the adjusted power level.

The method may further comprise the step of using a jump procedure for adjusting transmission power levels, the jump procedure comprising the steps of:
  gradually changing the transmission levels;
  detecting incorrect transmission levels; and
  changing, in opposite direction as compared to above gradual change, the transmission levels in response to the message detection.

The method may further comprise the step of allowing mobile stations outside a coverage area determined by the transmission signal strength to associate with the connection point, followed by a potential increase of the coverage area.

The method may also be characterized in that the step of detecting transmissions with signal strengths below a predetermined threshold comprises the steps of:
  measuring transmission levels from the mobile stations in the connection point; and
  estimating a coverage model using the measured transmission levels and knowing the output transmission power level of mobile stations.

In another preferred embodiment of the present invention, a wireless network with a carrier sense multiple access (CSMA) scheme is provided, the network comprising:
  a connection point in connection with a packet based network;
  at least one mobile station associated with the connection point;

wherein the connection point and the at least one mobile station comprise detection means arranged to detect transmissions with respect to a predetermined quality level, the connection point is arranged with power level adjustment means to adjust a power level to enable essentially all mobile stations within a cell to detect transmissions from the connection point, and the mobile stations are arranged to adjust power levels to enable mobile stations to detect transmissions from other mobile stations.

In the network, the transmission quality level may be determined on a continuous or regular basis.

The network may further comprise:
  means for detection of the transmission quality level in mobile stations; and
  means for transmission of a message to the connection point with information about the detection.

The message may be sent using a Beacon report message available in the IEEE 802.11k standardization protocol.

In another aspect of the present invention, the detection of the transmission quality may comprise detecting in a first mobile station a partial message exchange between nodes belonging to the same cell as the first mobile station.

The network may further comprise an arrangement for using a hidden node report available in a wireless communication protocol for distributing information about the detection of partial transmissions. The detection of transmission quality may also include a measurement of transmission signal strength.

The network may further comprise an arrangement for using a jump algorithm for adjusting transmission power levels, the jump algorithm comprising the steps of:
  gradually changing the transmission levels;
  detecting incorrect transmission levels; and changing, in opposite direction as compared to above gradual change, the transmission levels in response to the message detection.

The network may yet further comprise an arrangement for allowing mobile stations outside a coverage area determined by the transmission signal strength to associate with the connection point, and the network may then further comprise means for extending the coverage area if a mobile station outside the coverage area has associated with the connection point.

In yet another aspect of the present invention, in the network, the detection of transmissions with signal strengths below a predetermined threshold may further comprise an arrangement for:
- measuring transmission levels from the mobile stations in the connection point; and
- estimating a coverage model using the measured transmission levels and
- knowing the output transmission power level of mobile stations.

In another preferred embodiment of the present invention, a connection point device usable in a network according the above mentioned network is provided, wherein the connection point being arranged to detect transmissions with respect to a predetermined quality level, and being arranged to adjust a power level to enable essentially all mobile stations within a cell to detect transmissions from the connection point.

In yet another preferred embodiment of the present invention, a mobile station device usable in a network according to the above mentioned network is provided, wherein the mobile stations being arranged to adjust power levels to enable mobile stations to detect transmissions from other mobile stations within a coverage cell.

In still yet another preferred embodiment of the present invention, a wireless network system with a carrier sense multiple access (CSMA) scheme is provided, the network comprising:
- a connection point in connection with a packet based network;
- at least one mobile station associated with the access point; and wherein the connection point and the at least one mobile station are arranged to detect transmissions with respect to a predetermined quality level, the connection point is arranged to adjust a power level in response to the detection of transmission with respect to the predetermined quality level to enable essentially all mobile stations within a cell to detect transmissions from the connection point, and the mobile stations are arranged to adjust power levels in response to the detection with respect to the predetermined quality level to enable mobile stations to detect transmissions from other mobile stations within the cell.

In the system, the transmission quality level may be determined on a continuous or regular basis.

Still in the system the detection of transmissions below a predetermined quality level may further be arranged for:
- detection of the transmission quality level in mobile stations; and
- transmission of a message to the connection point with information about the detection.

The message may be sent using a Beacon report message available in the IEEE 802.11k standardization protocol.

The detection of the transmission quality may comprise detecting in a first mobile station a partial message exchange between nodes belonging to the same cell as the first mobile station. The system may further comprise an arrangement for using a hidden node report available in a wireless communication protocol for distributing information about the detection of the partial transmission exchange.

In the system, the detection of transmission quality may include a measurement of transmission signal strength.

In another preferred embodiment of the present invention, a computer program in a connection point operating in a wireless network according above described wireless network is provided, the computer program may be arranged to receive signals indicative of transmission quality and respond to current transmission quality status by adjusting transmission power levels in order to optimize the transmission quality in a cell, wherein the transmission quality is measured and compared to a predetermined quality level, and the connection point adjusts a transmission power level In yet another preferred embodiment of the present invention, a computer program in a mobile station operating in a wireless network according above described wireless network, the computer program is arranged to detect a partial transmission exchange between nodes within the network, wherein the detection of partial transmission, and to trigger the mobile station to transmit a message to the connection point about the partial transmission exchange.

In another aspect of the present invention, an instruction set for optimizing transmission coverage in a wireless network with a carrier sense multiple access (CSMA) scheme is provided, the instruction set comprising:

a first instruction set for detecting partial transmission exchange between nodes within the network;

a second instruction set for transmitting a message to a connection point if partial transmission exchange has been detected;

a third instruction for adjusting transmission levels in the connection point; and a fourth instruction set for adjusting transmission levels in mobile stations in order to reach other mobile stations within a network coverage cell.

Other aspects and advantages of the invention will be understood from the following detailed description together with the accompanying drawings.

BRIEF DESCRIPTION OF THE DRAWINGS

In the following, the invention will be described in a non-limiting way and in more detail with reference to exemplary embodiments illustrated in the enclosed drawings, in which.

DETAILED DESCRIPTION OF THE INVENTION

Figure 1:
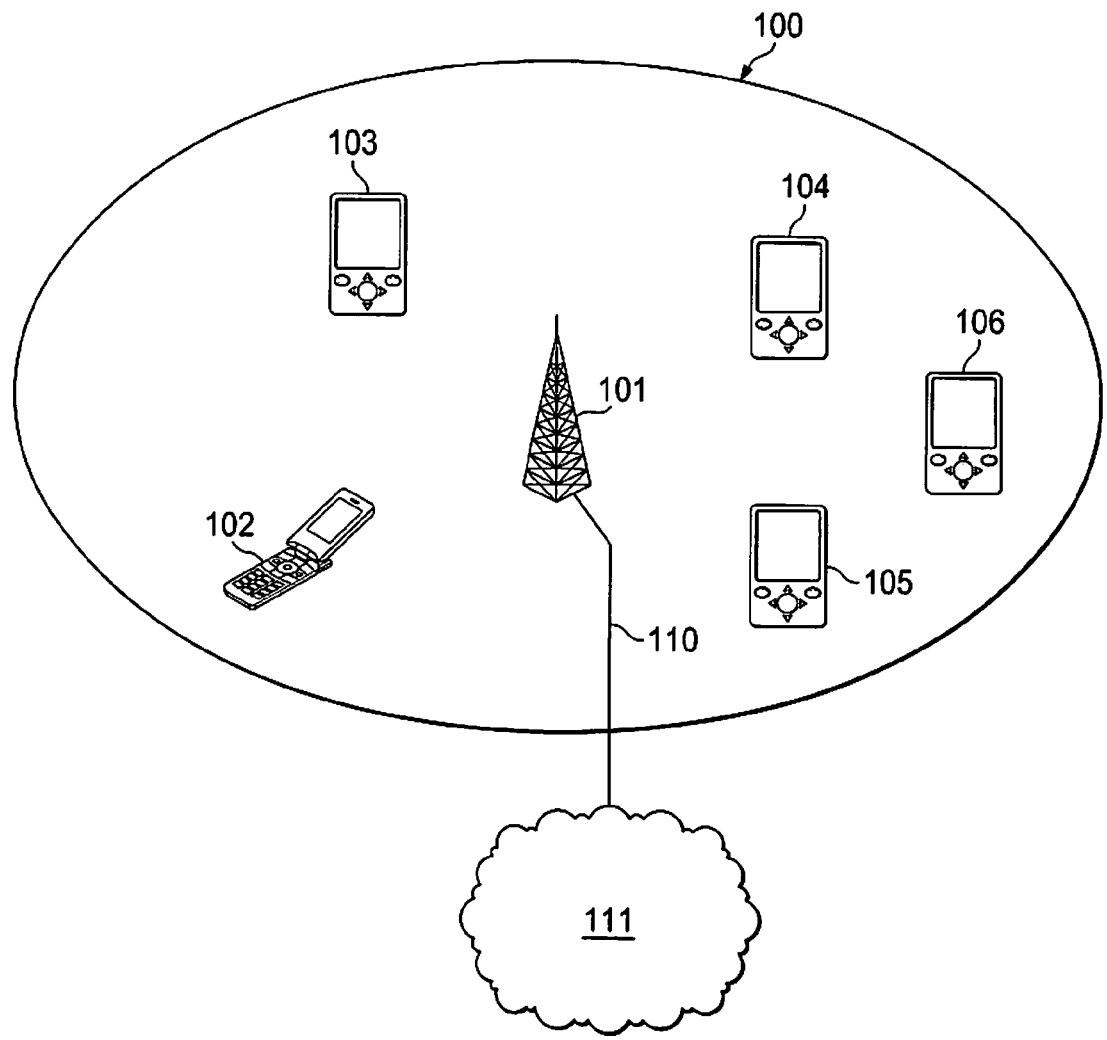
FIG. 1 illustrates a schematic of a wireless network according to the present invention with a hidden node problem.

FIG. 1 illustrates a schematic network topology according to the present invention, wherein a radio coverage cell 100 is determined from an access point 101, with "access point" is meant a central transceiving unit with which mobile stations communicate and gain access through to a packet based network, such a central unit may also be described as a connection point, wireless gateway, or a base station. In the cell, one or several mobile units 102, 103, 104, 105, and 106 may communicate with the access point 101 using a wireless communication application. The access point is connected 110 in turn to an IP network 111 or any similar packet based network through any connection means as understood by the person skilled in the art. The connection means 110 may either be a wired fixed line connection or a wireless fixed line connection.

In order to reduce the risk of traffic collisions in a wireless network, different collision avoidance protocols have been developed. One such collision avoidance protocol is the so called CSMA/CA protocol (Carrier Sense Multiple Access/Collision Avoidance). The CSMA/CA protocol forces nodes 101 . . . 106 to listen for a carrier signal present in the network and only if no such signal is detected is the node 101 . . . 106 allowed to transmit a message. If such a carrier signal is detected, the node 101 . . . 106 has to wait for a predetermined period of time before trying again. However, if nodes 101 . . . 106 in a network are unable to detect each other, the CSMA/CA scheme will deteriorate. This may be illustrated by using FIG. 1. If for instance node 102 which is a mobile station (STA) tries to communicate with the access point 101 (AP) and nodes 102 and 106 is out of range from each other, then it is possible that node 106 tries to communicate simultaneously with the access point 101. In such a case neither node 102 or 106 will be able to communicate with the access point 101 at that time instant. Both nodes will then back off and wait for a predetermined amount of time plus a random period of time before trying again. However, this reconnection time could actually be the same for both nodes 102 and 106, causing a collision to take place again.

Figure 9:
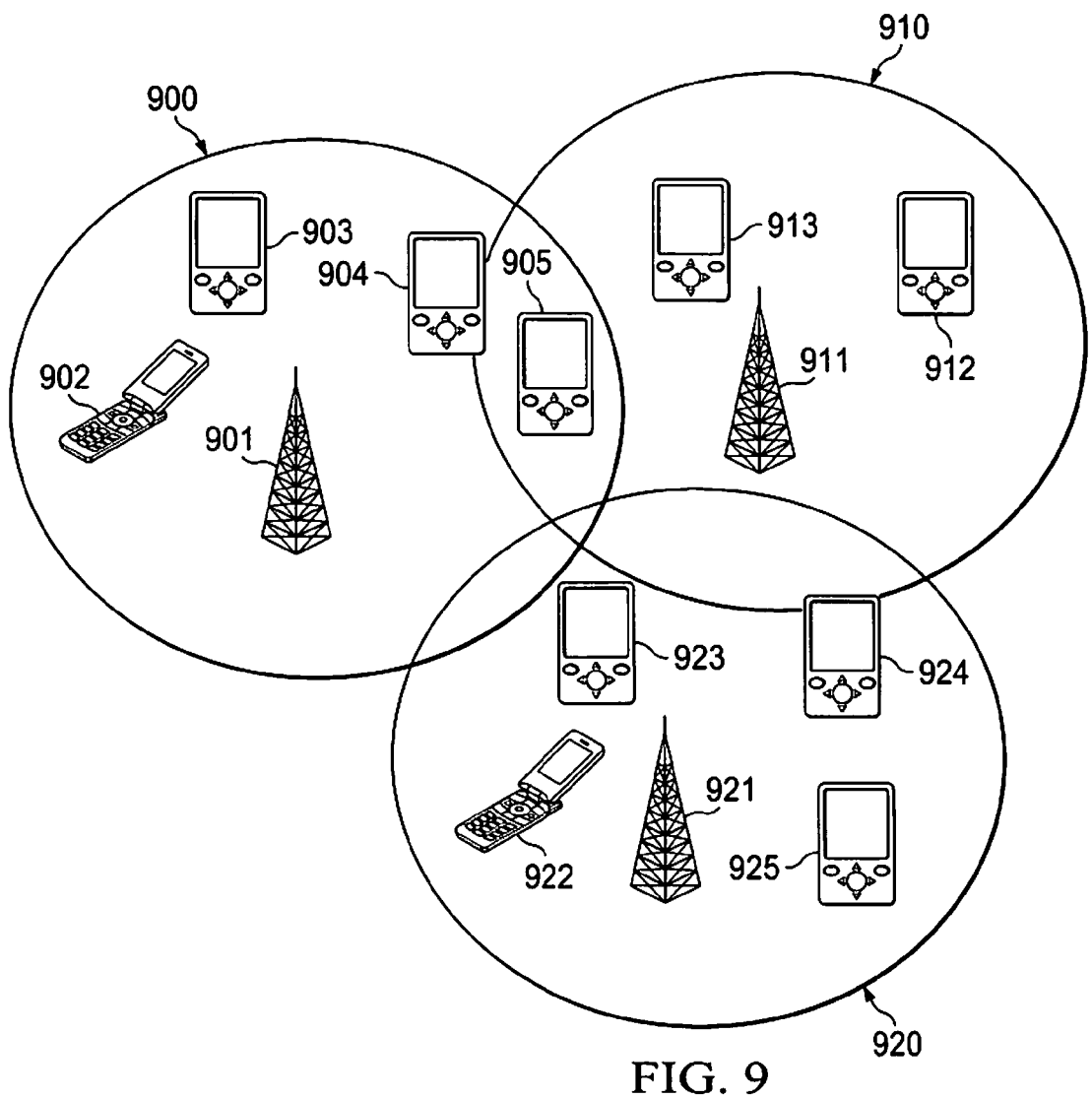
FIG. 9 illustrates a network structure comprising several coverage cells according to the present invention.

In a wireless CSMA system it is important that potential interferers can detect a transmission. However, as is illustrated in FIG. 9, if a transmission from a station 902 in a first cell 900 triggers the carrier sensing mechanism in a station 922 that is too far away to obstruct the transmission, this leads to inefficiency. Since nodes that normally could communicate with other nodes or access points 921 in their associated cell, defer from communicating if transmission signals can be sensed in a neighboring cell 920. Thus, there is accordingly an optimal sensing distance for where a transmission should trigger a carrier sensing mechanism. A cell is defined herein as the area wherein mobile stations associated with a specific access point/connection point reside in. Cells may overlap or be adjacent to each other and may form a continous or discontinous coverage area. A maximum cell area may be defined as the maximum radio range from an access point/connection point.

In an infrastructure network mobile stations 902 . . . 905, 912 . . . 913, and 922 . . . 925 communicate with access points 901, 911, and 921 respectively. Many different criteria may be set up for determining the optimal carrier sensing distance for an access point or cell. In a preferred embodiment of the present invention the optimal carrier sensing distance from the AP is determined from an estimation of the distance to the most remote mobile station associated with the access point. However, the carrier sensing distance for the mobile stations must be greater to be detected by a mobile station on the opposite side of the access point.

Figure 2:
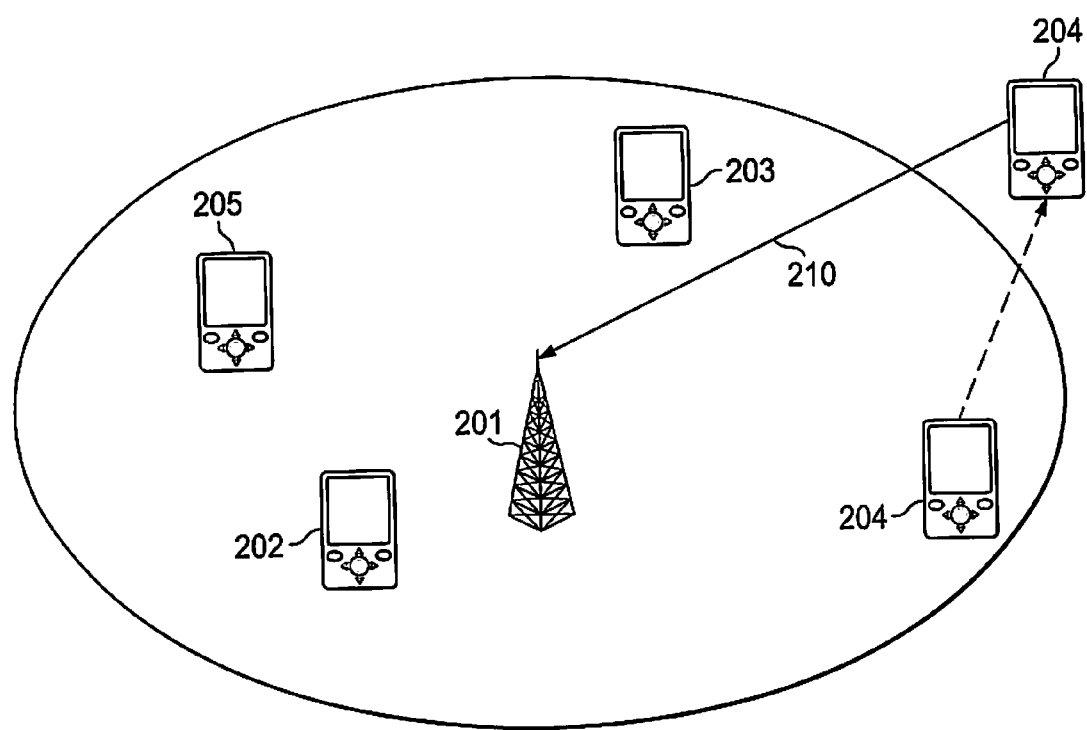
FIG. 2 illustrates a network example wherein a mobile station moves out of range.
Figure 3:
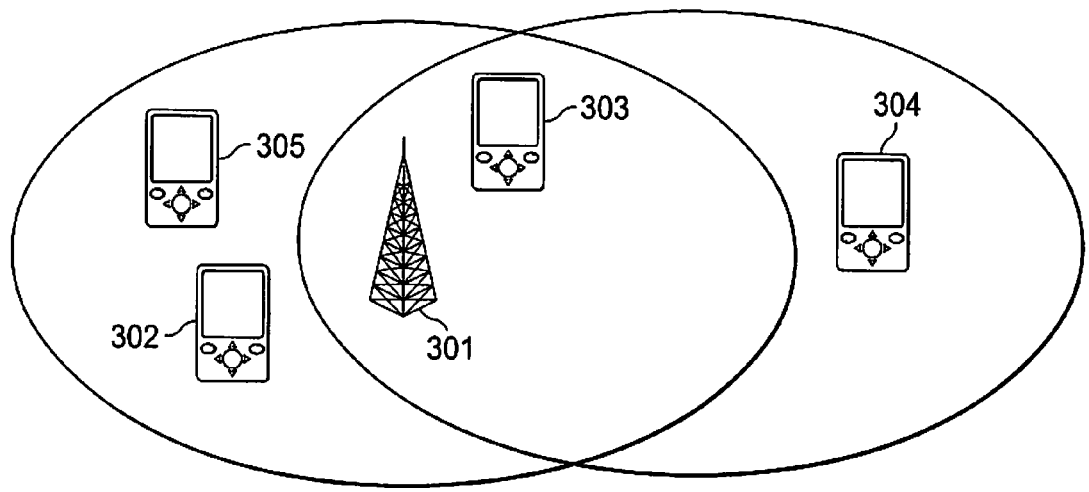
FIG. 3 illustrates a network example wherein an access point (AP) detects a mobile station out of range.

In a preferred embodiment of the present invention this is solved by controlling the carrier sensing distance by adjusting the transmit power. The minimum transmit power $P_{minAP}$ of the access point is set so that the most distant mobile station receives the transmission with signal strength $C_0$. The correct $P_{minAP}$ may be determined in two ways as can be illustrated in FIGS. 2 and 3:

1. Mobile stations 204 that detect transmissions from an access point 201 with signal strength below $C_0$ send a message 210 to the access point 201 with information about the signal strength. In an IEEE 802.11k standard wireless protocol, functionality for this message is provided through the Beacon Report specified in the 802.11k standard.

2. If the transmit power of the mobile stations 302 . . . 304 is known to the access point 301, the $P_{minAP}$ may be determined by measuring the signal strength of the most distant mobile station 304.

The minimum transmit power $P_{minMs}$ of the mobile stations, is set to the minimum power of the access point, $P_{minAP}$, plus a margin, M. The margin M may be set large enough for all transmissions from mobile stations to be detected by all other stations, but not larger. Alternatively, a smaller margin may be used in order to reduce inter-cell interference at the expense of allowing some intra-cell collisions.

Figure 4:
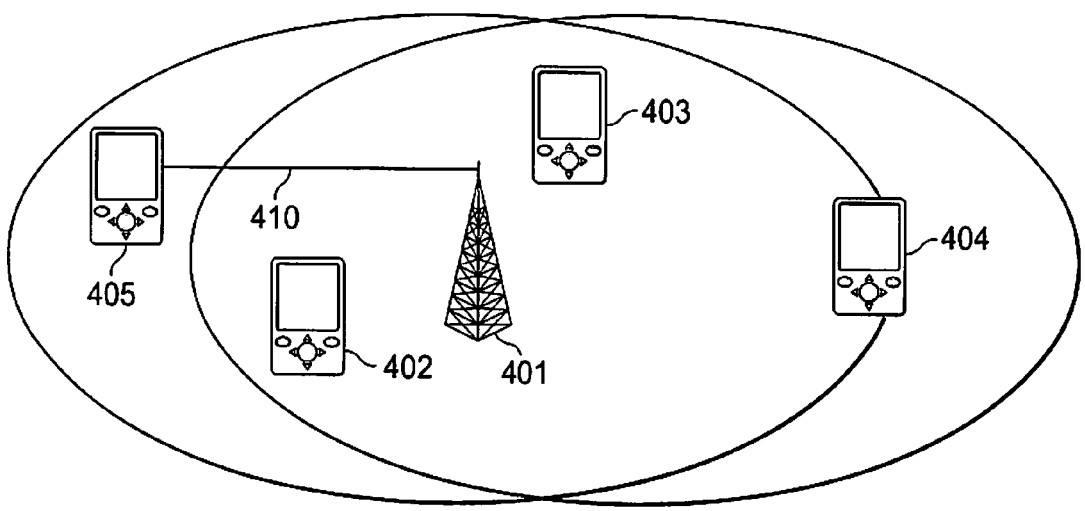
FIG. 4 illustrates a network example wherein a mobile station is partly within range.

The margin M may be adjusted based on messages from mobile stations that only hear part of a frame exchange between two stations, as is illustrated in FIG. 4. Mobile station 405 can only detect traffic from the access point 401 to the mobile station 404. Traffic from the mobile station 404 to the access point is not strong enough to be detected by the mobile station 405. The mobile station 405 then issues a report message 410 of this information to the access point 401. In an IEEE 802.11k standard wireless protocol, functionality for this message is provided through the Hidden Node Report specified in the 802.11k standard.

Figure 5:
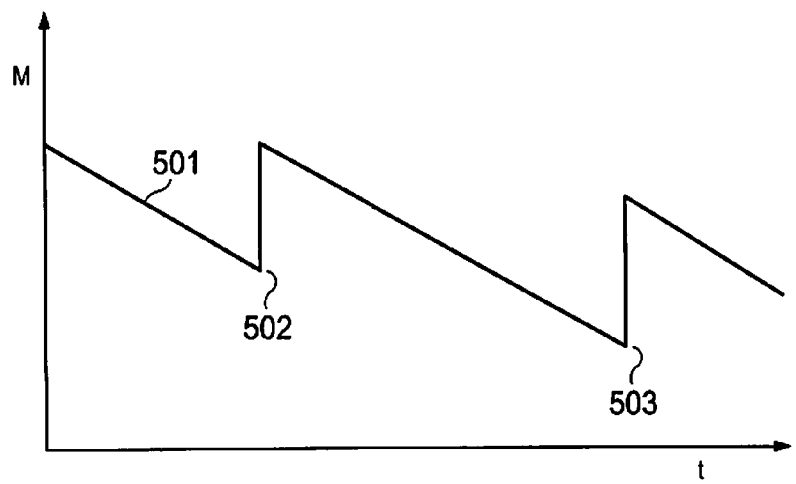
FIG. 5 illustrates a schematic example of a margin adjustment.

There are several ways of adjusting the margin M based on the messages including, but not limited to, a jump algorithm as illustrated in FIG. 5. The margin level is gradually lowered during time 501 and when the margin level passes a threshold where mobile stations trigger a message due to partially missing transmission detection as discussed above a report message 410 is sent to the access point 401. The margin M level is then increased with a jump to a new level 502 and during time this level is gradually lowered again, and so on. The new level is preferably substantially higher than the level that triggered the message response. The amount of increase may be determined from several different choices including, but not limited to, fixed level change in absolute figures, fixed percentage change, to a certain predefined level, or a randomly selected level change. The above jump algorithm may also be "reversed" in the respect that it is used for detecting to large power levels.

The minimum mobile station power may also be estimated based on uplink measurements in the access point. The two weakest (presumably the most distant) mobile stations are identified, their path loss to the access point is measured or estimated, and the transmit power level is adjusted for the mobile stations to overcome the sum of the distances corresponding to their path losses. This will be enough transmit power to trigger the carrier sense for the worst case when two mobile stations are opposite to each other relative the access point. This is true provided the limiting factor is not an obstacle or other interference situation located between the two mobile stations.

The appropriate and determined $P_{minMs}$ may be communicated to the mobile stations as a common message in a beacon or as individual messages to each mobile station.

Mobile stations are normally associated with an access point according to different association criteria depending on infrastructure configuration, such as radio signal strength, transmission quality, average or intermittent bit rate, access point owner, and so on.

Figure 6:
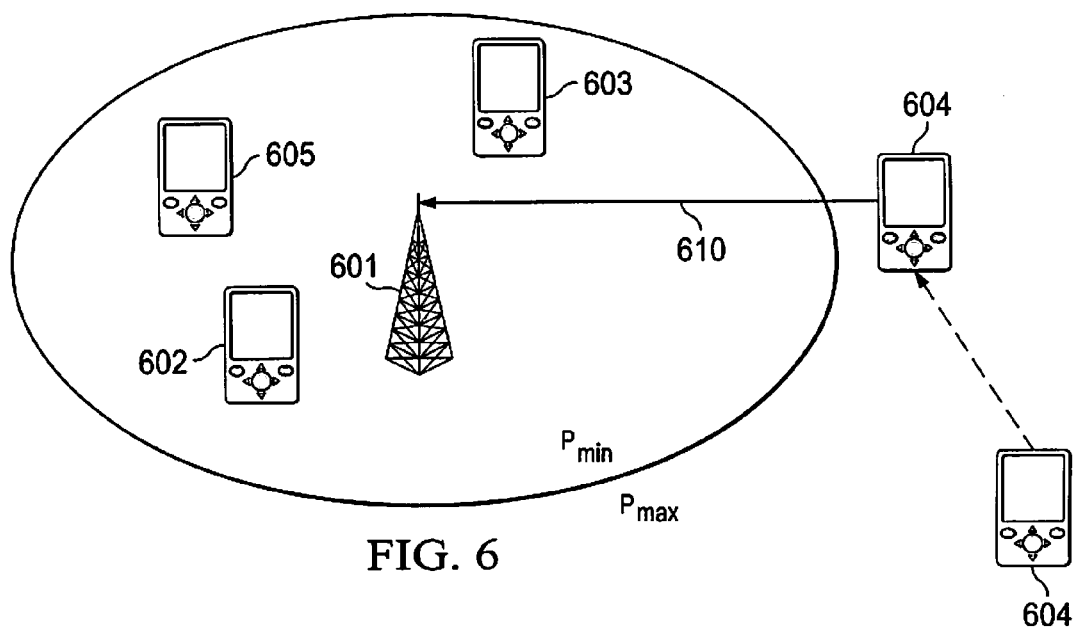
FIG. 6 illustrates a network example wherein a mobile station is associated with an access point (AP).

Now turning to FIG. 6, preferably in e.g. single-cell scenarios, it is an advantage if it is possible for mobile stations 604 to detect and associate with an access point 601 further away from the access point 601 than the currently determined momentary carrier sensing distance, if so potentially increasing the coverage area. In a preferred embodiment of the present invention this is solved by alternating the transmit power of the access point when transmitting beacon frames with low power $P_{min}$ and high power, $P_{max}$. Mobile stations that are further away 604 will still detect frames transmitted with $P_{max}$ and may associate with the access point 601. Mobile stations located within the carrier sensing distance will receive frames transmitted with both high and low powers. Also the first method of detecting too low transmit power of an access point described above will work correctly since the frames that are transmitted with $P_{min}$ will trigger the report (e.g. the Beacon Report).

In an 802.11 standard network infrastructure both passive and active scanning is available. The above mentioned solutions is described and illustrated in the case of passive scanning mode of the network. In a passive scanning mode, a radio network interface card (NIC) searches for access points. Periodically, access points broadcast a beacon, and the radio NIC receives these beacons while scanning and takes note of the corresponding signal strengths. The beacons contain information about the access point, including service set identifier (SSID), supported data rates, etc. The radio NIC can use this information along with the signal strength to compare access points and decide upon which one to use.

Active scanning is similar, except that the radio NIC of the mobile station initiates the process by broadcasting a probe frame, and all access points within range respond with a probe response. Active scanning enables a radio NIC to receive immediate response from access points, without waiting for a beacon transmission.

In the case of mobile stations using active scanning it is possible to solve the problem by sending probe response messages with power level $P_{max}$ (which need not be the maximum available transmission power level but is the currently set allowed maximum transmission power level) or at least a transmission level higher than $P_{min}$.

In some cases it is desirable to increase the transmission power level in order to increase the bit rate at the cost of increased interference. The use of such higher power levels may be based on the measurements on access points and mobile stations not associated to the access point that is controlled. If no surrounding wireless communication is detected there is no need to decrease the power level. This may be controlled per mobile station, using $P_{minMs}$ in one end of the served area while using a higher power of transmissions from the access point.

Advantages of the preferred embodiments of the present invention are:
  The transmit powers are automatically adjusted to fit the current spatial distribution of mobile stations.
  Increased quality and capacity when access points are located close to each other, i.e. high density infrastructure installations.
  Reduced power consumption in the mobile stations and access points.

Figure 7A:
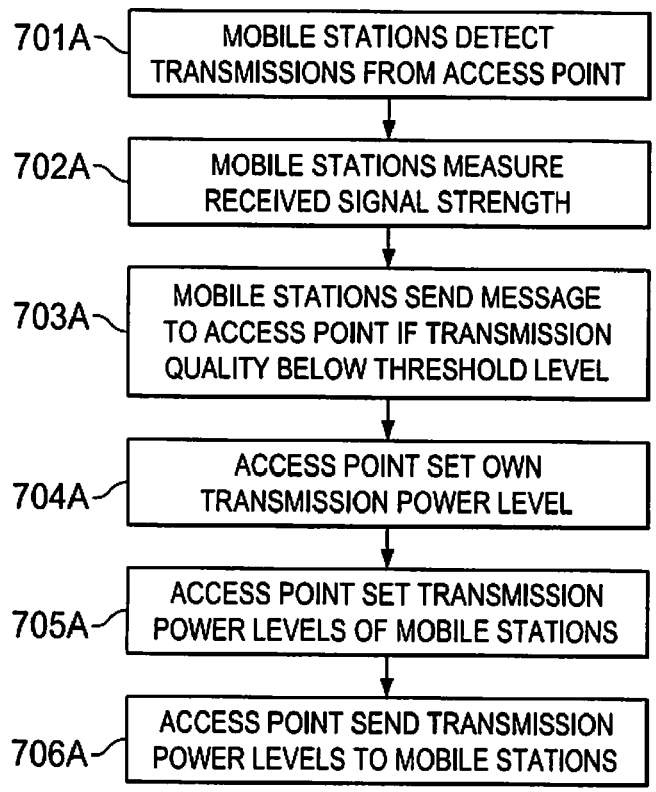
FIG. 7A illustrates a schematic block diagram of a method of a preferred embodiment of the present invention.

In FIG. 7A a method according to a preferred embodiment of the present invention is schematically illustrated in a block diagram. The method comprises the steps of:
  1. In mobile stations, detecting transmissions from an access point (step 701A);
  2. Measuring the received signal strength (step 702A);
  3. Sending a message to the access point if the transmission quality is below a predefined threshold level (step 703A); and
  4. Setting the transmission power level of the access point so all mobile stations can detect transmissions (step 704A).
  5. Setting the transmission power level for the mobile stations to above transmission power level for the access point with a margin enabling mobile stations within the cell to detect transmission from mobile stations (step 705A) to such an extent that the hidden node problems are kept on a reasonable level.
  6. Sending the above transmission power level to the mobile stations (step 706A).

Figure 7B:
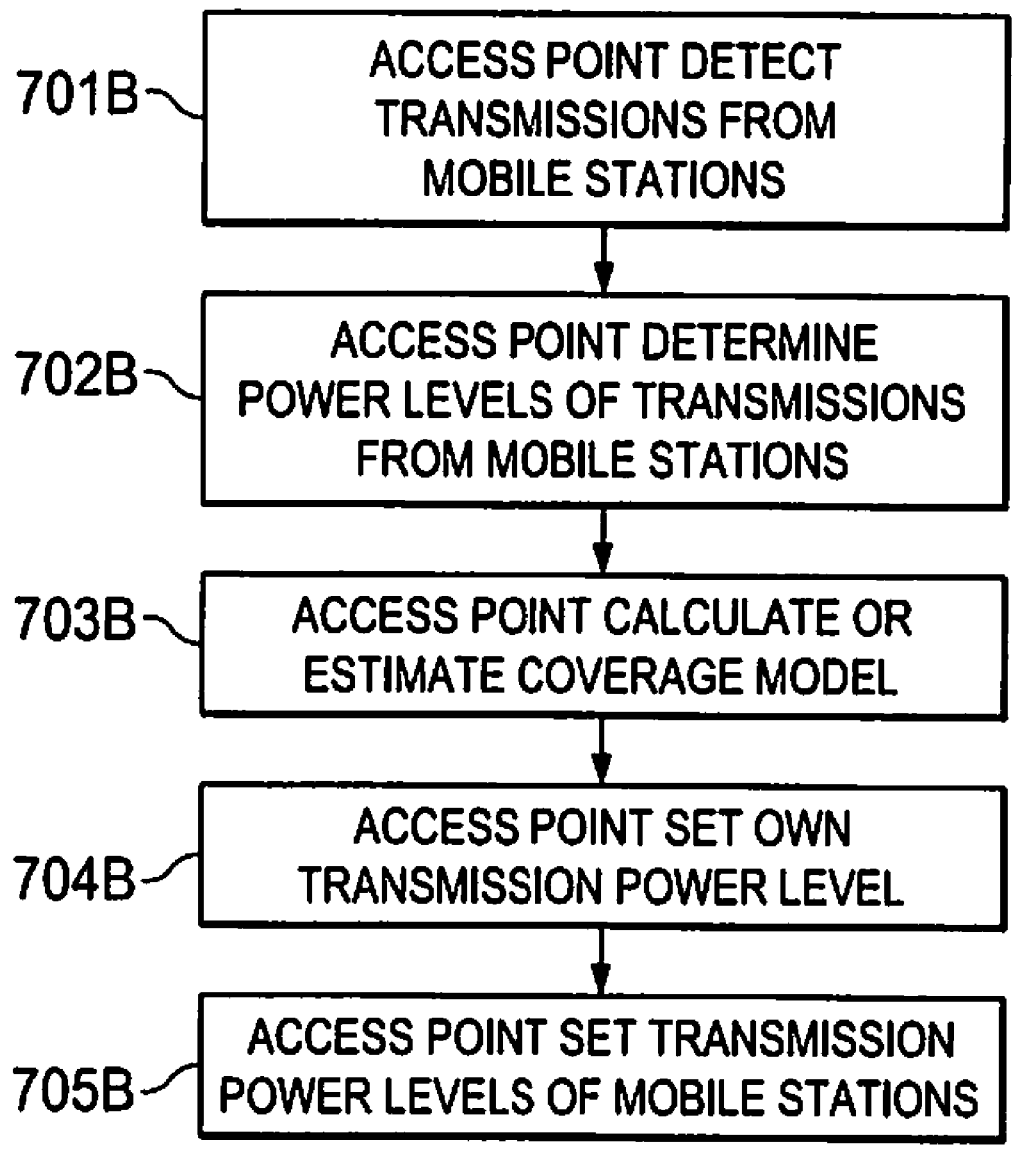
FIG. 7B illustrates a schematic block diagram of a method of a preferred embodiment of the present invention.

In another method of an embodiment of the present invention the access point is responsible for detecting the transmission level. FIG. 7B may be used for the illustrative purposes again, the method comprising the steps:
  1. Detecting transmissions from mobile stations in the access point (step 701B);
  2. Determining the transmission power level of the transmission from the mobile stations (step 702B);
  3. Calculating or estimating a coverage model using the determined transmission power and quality levels (step 703B);
  4. Setting the transmission power level of the access point so all mobile stations can detect transmissions (step 704B).
  5. Setting the transmission power level for the mobile stations to above transmission level for the access point with a margin enabling mobile stations within the cell to detect transmission from mobile stations (step 705B) to such an extent that the hidden node problems are kept on a reasonable level.

Figure 8:
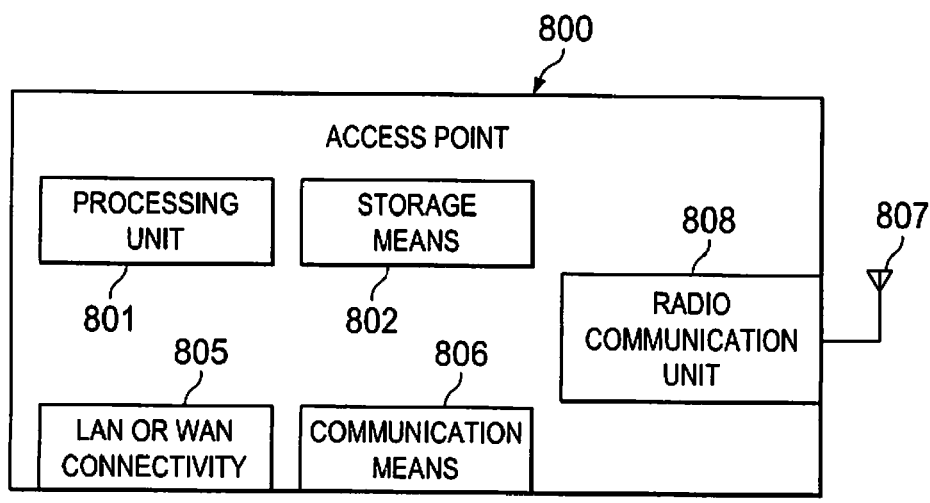
FIG. 8 illustrates a schematic block diagram of an apparatus of a preferred embodiment of the present invention.

Turning now to FIG. 8 wherein an access point apparatus 800 for use in an infrastructure solution according to the present invention is schematically illustrated in a block diagram. An apparatus 800 in such a network solution includes at least one processing unit 801, at least one storage means 802, and at least one radio communication unit 808 with an optional antenna 807. Optionally other units may be included in the apparatus as well, such as communication means 806 for a LAN or WAN connectivity 805, such as e.g. Ethernet, Token Ring, Local Talk, X.25, ATM, ADSL, ISDN, GSM, 3G, or even an optical fiber connectivity link, serial communication or similar connectivity means, connection 805 for external storage modules, and so on.

A mobile station apparatus (not shown, but FIG. 8 may be used for illustrative purposes as well) consist of similar units and means as an access point apparatus 800.

FIG. 9 illustrates a network topology where several coverage cells 900, 910, and 920 are located close to each other and where mobile stations 902, 903, 904, 905, 912, 913, 922, 923, 924, and 925 may move between cells 900, 910, and 920. The mobile stations are associated to respective connection points 901, 911, and 921 depending on signal strength, connection point ownership, connection point throughput or other characteristics governing transmission quality or costs. For instance in FIG. 9 mobile station 905 may associate with either connection point 901 or 911.

It should be appreciated by the person skilled in the art that even though the present invention has been illustrated by nodes in the form of mobile stations using wireless communication protocols in the IEEE 802.11 standard series; such limitation is only for illustrative reasons. The nodes may be any kind of wireless communication device connecting to an access point or base station, including, but not limited to, mobile stations such as PDA's (personal digital assistants), laptop computers, telephones using a wireless interface, and non mobile stations such as personal computers, workstations, household appliances, industrial equipment, and so on. Wireless communication links may be upheld by one or several different protocols using a CSMA scheme, including, but not limited to, 802.11 series, UWB, IEEE 802.15, HomeRF, IR, and JTRS.

Also it should be appreciated by the person skilled in the art that the above mentioned embodiments of the present invention may also be applicable in an ad-hoc network topology, wherein no central controlling node (e.g. an access point) is present instead all nodes, e.g. client stations, infrastructure building nodes, or combinations of these two, together form the network and may even relay traffic between nodes, between cells, and to dedicated gateways to an IP network not being part of the ad-hoc network, such as the Internet, other external IP network or internal IP networks e.g. an internal company network allowing wireless stations work in parallel with a fixed network structure without mixing the two networks for instance in order to reduce security issues. A relaying node may be called a connection point. In the case of an ad-hoc network topology a cell may be defined in several different ways depending on network model, e.g. a cell may be defined as the area wherein nodes are connected with each other with a certain IP sub-address, as an area covered by radio transmissions from a connection point (relaying node, or a gateway), or as an area defined by all nodes serviced by a certain gateway with access to a fixed IP network or another cell.

Although the invention has been described in detail for the purpose of illustration, it is to be understood that such detail is solely for that purpose and that variations can be made therein by those skilled in the art without departing from the spirit and scope of the invention except as it may be limited by the following claims.

The invention claimed is:

1. A method for controlling wireless coverage in a wireless network with a carrier sense multiple access (CSMA) scheme, comprising the steps of:
   detecting transmissions with respect to a predetermined quality level; adjusting a transmission power level in a connection point to a minimum transmit power Pminap by determining a carrier sensing distance from the connection point using an estimation of a distance to a remotest mobile station associated with the connection point to enable essentially all mobile station or stations within a cell to detect transmissions from said connection point;
   adjusting a transmission power level of each mobile station to a minimum transmit power Pminms where the Pminms is set to the minimum transmit power Pminap plus a margin M where the margin M is set only large enough to enable said mobile station or stations to detect transmissions from the other mobile stations within the cell.

2. The method according to claim 1, wherein said transmission quality level is determined on a continuous or regular basis.

3. The method according to claim 1, wherein the
   step of detecting transmission quality level further comprises the steps of:
   detecting said transmission quality level in mobile stations; and
   sending a message to said connection point with information about said detection.

4. The method according to claim 3, wherein said message is sent using a Beacon report message available in the IEEE 802.11k protocol.

5. The method according to claim 1, wherein said step of detecting said transmission quality comprises detecting in a first mobile station a partial message exchange between nodes belonging to the same cell as said first mobile station.

6. The method according to claim 5, further comprising the step of using a hidden node report available in a wireless communication protocol for distributing information about said detection of partial message exchanges.

7. The method according to claim 1, wherein said detection of transmission quality includes the step of measuring transmission signal strength.

8. The method according to claim 7, further comprising the step of:
   enabling one or several mobile stations outside an adjusted coverage area determined by said transmission signal strength to associate with said connection point using an alternating transmission power level of said connection point between an adjusted power level and a higher power level.

9. The method according to claim 7, further comprising the step of:
   enabling one or several mobile stations outside an adjusted coverage area determined by said transmission signal strength to associate with said connection point by responding to active scanning with higher power than the adjusted power level.

10. The method according to claim 7, wherein the step of detecting transmissions with signal strengths with respect to a predetermined threshold further comprises the steps of:
    measuring transmission quality levels from said mobile stations in said connection point; and estimating a coverage area using said measured transmission quality levels and knowing output transmission power levels of said mobile stations.

11. The method according to claim 3, further comprising the step of:
    using a jump procedure for adjusting transmission power levels, said jump procedure comprising the steps of:
    gradually changing said transmission levels;
    detecting incorrect transmission levels; and changing, in opposite direction as compared to said gradual change, said transmission levels in response to said message detection.

12. A wireless network with a carrier sense•multiple access (CSMA) scheme, said network comprising:
    a connection point in connection with a packet based network; at least one mobile station associated with said connection point; wherein said connection point and said at least one mobile station comprise detection means arranged to detect transmissions with respect to a predetermined quality level, said connection point is arranged with power level adjustment means to adjust a transmission power level to a minimum transmit power Pminap by determining a carrier sensing distance from the connection point using an estimation of a distance to a remotest mobile station associated with the connection point to enable essentially all mobile stations within a cell to detect transmissions from said connection point, and each mobile station is arranged to adjust a transmission power level to a minimum transmit power Pminms where the Pminms is set to the minimum transmit power Pminap plus a margin M where the margin M is set only large enough to enable one or several mobile stations to detect transmissions from the other mobile stations within the cell.

13. The network according to claim 12, wherein said transmission quality level is determined on a continuous or regular basis.

14. The network according to claim 12, further comprising:
means for detection of said transmission quality level in mobile stations; and
means for transmission of a message to said connection point with information about said detection.

15. The network according to claim 14, wherein said message is sent using a Beacon report message available in the IEEE 802.11k protocol.

16. The network according to claim 12, wherein said detection of said transmission quality comprise detecting in a first mobile station a partial message exchange between nodes belonging to the same cell as said first mobile station.

17. The network according to claim 16, further comprising an arrangement for using a hidden node report available in a wireless communication protocol for distributing information about said detection of partial transmission exchange.

18. The network according to claim 14, wherein said detection of transmission quality includes a measurement of transmission signal strength.

19. The network according to claim 14, further comprising an arrangement for using a jump algorithm for adjusting transmission power
levels, said jump algorithm comprising the steps of: gradually changing said transmission levels; detecting incorrect transmission levels; and
changing, in opposite direction as compared to said gradual change, said transmission levels in response to said message detection.

20. The network according to claim 18, further comprising an arrangement for allowing at least one mobile station outside a coverage area determined by said transmission signal strength to associate with said connection point.

21. The network according to claim 20, further comPrising means for extending said coverage area if a mobile station outside said coverage area has associated with said connection point.

22. The network according to claim 18, further comprising an arrangement for enabling mobile stations outside an adjusted coverage area determined by said transmission signal strength to associate with said connection point using an alternating transmission power level of said connection point between said adjusted power level and a higher power level.

23. The network according to claim 18, further comprising an arrangement for enabling mobile stations outside an adjusted coverage area determined by said transmission signal strength to associate with said connection point using an active or passing scanning method.

24. The network according to claim 12, wherein the detection means arranged to detect transmissions with respect to a predetermined quality level further comprises an arrangement for:
measuring transmission levels by said mobile stations at said connection point; and
estimating a coverage model using said measured transmission levels and knowing output transmission power levels of said mobile stations.

25. A connection point device usable in a network according to claim 12, wherein said connection point being arranged to detect transmissions with respect to a predetermined quality level, and being arranged to adjust a transmission power level to enable essentially all mobile stations within a cell to detect transmissions from said connection point.

26. A mobile station device usable in a network according to claim 12, wherein said mobile stations being arranged to adjust transmission power levels to enable mobile stations to detect transmissions from other mobile stations within a coverage cell.

27. A wireless network system with a carrier sense multiple access (CSMA) scheme, said network comprising:
a connection point in connection with a packet based network; at least one mobile station associated with said access point; and wherein said connection point and said at least one mobile station are arranged to detect transmissions with respect to a predetermined quality level, said connection point being arranged to adjust a transmission power level to a minimum transmit power Pminap by determining a carrier sensing distance from the connection point using an estimation of a distance to a remotest mobile station associated with the connection point in response to said detection of transmission with respect to said predetermined quality level to enable essentially all mobile stations within a cell to detect transmissions from said connection point, and each mobile station being arranged to adjust a transmission power level to a minimum transmit power Pminms in response to said detection with respect to said predetermined quality level where the Pminms is set to the minimum transmit power Pminap plus a margin M where the margin M is set only large enough to enable mobile stations to detect transmissions from the other mobile stations within the cell.

28. The system according to claim 27, wherein said transmission quality level is determined on a continuous or regular basis.

29. The system according to claim 27, wherein the detection of transmissions with respect to a predetermined quality level is further arranged for:
detection of said transmission quality level in mobile stations; and
transmission of a message to said connection point with information about said detection.

30. The system according to claim 29, wherein said message is sent using a Beacon report message available in the IEEE 802.11k protocol.

31. The system according to claim 27, wherein
said detection of said transmission quality comprise detecting in a first mobile station a partial message exchange between nodes belonging to the same cell as said first mobile station.

32. The system according to claim 31, further comprising an arrangement for using a hidden node report available in a wireless communication protocol for distributing information about said detection of partial transmission exchange.

33. The system according to claim 29, wherein said detection of transmission quality includes a measurement of transmission signal strength.

* * * * *